(12) United States Patent
Ince et al.

(10) Patent No.: US 10,316,899 B2
(45) Date of Patent: Jun. 11, 2019

(54) CAGED WEDGE CLUTCH

(71) Applicant: SCHAEFFLER TECHNOLOGIES AG & CO. KG, Herzogenaurach (DE)

(72) Inventors: Marion Jack Ince, Mount Holly, NC (US); Guihui Zhong, Charlotte, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 253 days.

(21) Appl. No.: 15/388,292

(22) Filed: Dec. 22, 2016

(65) Prior Publication Data

US 2018/0180109 A1  Jun. 28, 2018

(51) Int. Cl.
| | |
|---|---|
| *F16D 13/16* | (2006.01) |
| *F16D 13/66* | (2006.01) |
| *F16D 13/68* | (2006.01) |
| *B60K 17/02* | (2006.01) |
| *B60K 17/34* | (2006.01) |

(52) U.S. Cl.
CPC ............ *F16D 13/16* (2013.01); *F16D 13/66* (2013.01); *F16D 13/68* (2013.01); *B60K 17/02* (2013.01); *B60K 17/34* (2013.01)

(58) Field of Classification Search
CPC ......... F16D 13/16; F16D 13/66; B60K 17/02; B60K 17/34
See application file for complete search history.

(56) References Cited

U.S. PATENT DOCUMENTS

| | | | | |
|---|---|---|---|---|
| 285,940 | A * | 10/1883 | Wels | F16D 13/16 192/76 |
| 549,454 | A * | 11/1895 | Lee | F16D 13/16 192/76 |
| 905,156 | A * | 12/1908 | Domfield | F16D 13/16 192/107 R |
| 1,469,564 | A * | 10/1923 | Marotta | F16D 13/16 192/76 |
| 1,472,710 | A * | 10/1923 | Wilson | F16D 13/16 192/65 |
| 1,618,259 | A * | 2/1927 | Aldridge | F16D 13/16 192/76 |
| 2,277,659 | A * | 3/1942 | Bokich | F16D 13/16 192/78 |
| 2,278,556 | A * | 4/1942 | Osterholm | F16D 13/16 192/76 |

(Continued)

OTHER PUBLICATIONS

Brian Lee; AWD Disconnect—Escaping the clutches of the dog; Schaeffler Symposium; 2014; pp. 1-27.

*Primary Examiner* — Stacey A Fluhart
(74) *Attorney, Agent, or Firm* — Brooks Kushman P.C.

(57) ABSTRACT

A wedge clutch imparts a wedging effect to selectively transfer power through powertrain components. The wedge clutch includes a plurality of wedge segments arranged annularly about an axis and configured to collectively constrict and expand with respect to the axis to correspondingly lock and unlock the clutch. Each wedge segment includes an aperture. A cage assembly is configured to control relative movement of the plurality of wedge segments with respect to each other. The cage assembly including a plurality of pins, each extending through one of the apertures to control the relative movement of the wedge segments.

14 Claims, 5 Drawing Sheets

(56) References Cited

U.S. PATENT DOCUMENTS

| | | | |
|---|---|---|---|
| 2,782,893 A * | 2/1957 | Chapman | F16D 13/16 |
| | | | 192/105 CE |
| 2015/0014113 A1 | 1/2015 | Ohr et al. | |
| 2015/0083539 A1 | 3/2015 | Lee et al. | |
| 2015/0152921 A1 | 6/2015 | Lee | |
| 2016/0084326 A1 | 3/2016 | Ramsey | |
| 2016/0238090 A1 * | 8/2016 | Spencer | F16D 27/10 |

* cited by examiner

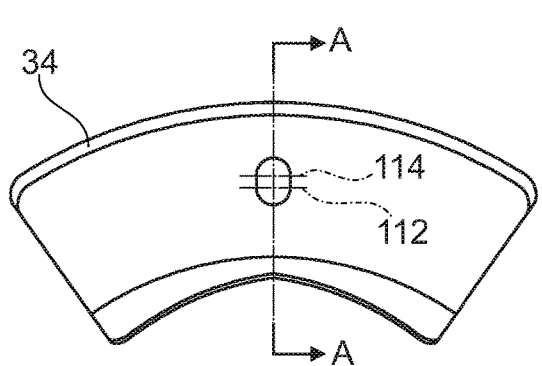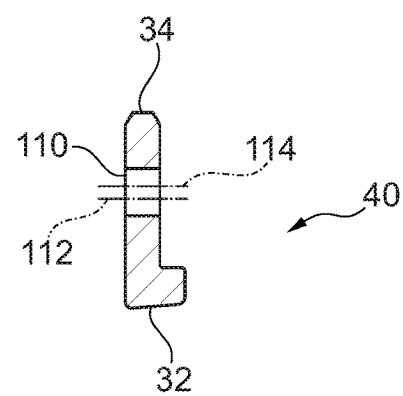
Fig. 2A          Fig. 2B
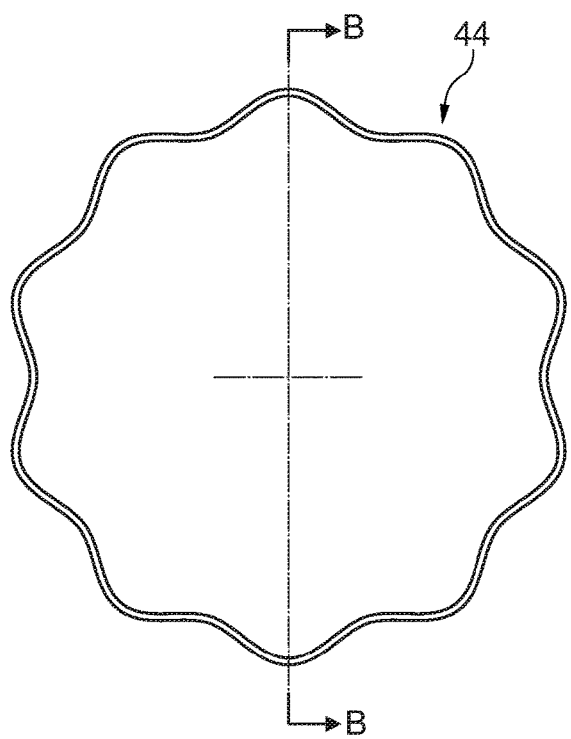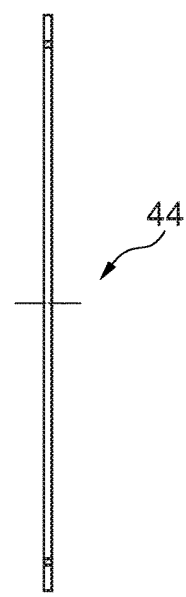
Fig. 3A          Fig. 3B

CAGED WEDGE CLUTCH

TECHNICAL FIELD

The present disclosure relates to a wedge clutch for selectively coupling two or more powertrain components to each other.

BACKGROUND

In a motor vehicle, a four-wheel drive system or an all-wheel drive system can be selectively activated by a clutch. The clutch can be part of a power transfer unit for connecting a power source to a secondary drive shaft when it is desired to deliver power to the secondary drive shaft. It is known that such a clutch can be a dog clutch. Dog clutches are prone to teeth clash or blocking. It is also known that such a clutch can be a wet clutch in a differential. Pressurized fluid must be continuously supplied to keep the clutches in a closed mode, adding to the power usage associated with usage of the clutch. Wedge clutches are known, such as those described in U.S. Patent Publication Numbers 2015/0083539, 2015/0014113, and 2015/0152921.

SUMMARY

According to one embodiment, a clutch includes a plurality of wedge segments arranged annularly about an axis and configured to collectively constrict and expand with respect to the axis. Each wedge segment includes an aperture. A cage assembly is configured to control relative movement of the plurality of wedge segments with respect to each other. The cage assembly includes a plurality of pins. Each of the pins extend through one of the apertures.

The cage assembly can include first and second washers arranged about the axis and spaced from one another. The first and second washers each include a plurality of apertures, and each of the pins extend through one of the apertures of each washer.

The wedge segment apertures can have an oblong profile and the cage assembly pins can have a cylindrical portion extending through the oblong profile such that relative movement of the wedge segments is enabled by the aperture around the pins.

The cage assembly can include an annular spring about the axis and configured to bias the wedge segments radially inward or outward, depending on the configuration of the wedge clutch. The spring may have a wavy profile to distribute the biasing force amongst the wedge segments. The spring may be disposed between the first and second washers.

In another embodiment, a wedge clutch has an annular disk including a plurality of individual wedge segments arranged about an axis. Radial movement of the wedge segments toward and away from the axis locks and unlocks the clutch. A cage assembly is coupled to each of the wedge segments and is configured to control radial movement of the wedge segments during locking and unlocking of the clutch.

In another embodiment, a cage assembly for controlling radial movement of wedge segments of a wedge clutch is provided. The assembly includes a pair of spaced-apart annular washers on either side of the wedge segments. The assembly also includes a plurality of pins connecting the washers and extending through the wedge segments.

The pins may be fixed to the washers via riveting, welding, or other means, and allow movement of the wedge segments in a radial direction. The wedge segments may be limited or controlled in radial movement due to the pins contacting the sidewalls of the apertures.

BRIEF DESCRIPTION OF THE DRAWINGS

FIG. 2A is a plan view of a wedge segment of the wedge clutch of FIG. 1, according to one embodiment.

FIG. 2B is a cross-sectional view of the wedge segment of FIG. 2A taken along line A-A of FIG. 2A.

FIG. 3A is a plan view of a biasing spring with a wavy, continuous profile, according to one embodiment.

FIG. 3B is a cross-sectional view of the spring of FIG. 3A taken along line B-B of FIG. 3A.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
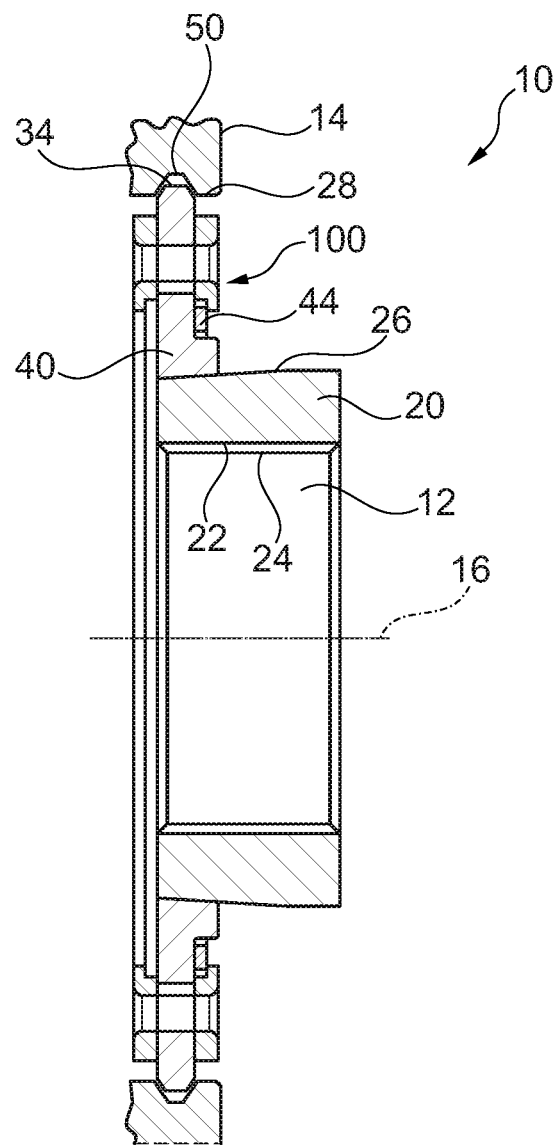
FIG. 1 is a side cross-sectional view of a wedge clutch for selectively coupling an input to an output, according to one embodiment.

Referring to FIG. 1, a portion of a power-transfer unit (PTU) for a powertrain of an automotive vehicle is shown. The PTU may be utilized for selectively activating all-wheel drive or four-wheel drive in the automotive vehicle, for example. To selectively activate the all-wheel drive or four-wheel drive, a wedge clutch 10 is utilized. Details of the structure and operation of the wedge clutch is provided herein. Additional structure and operation of the wedge clutch is provided in the following documents, which are incorporated by reference herein: U.S. patent application Ser. No. 15/388,297, filed on the same day as this disclosure; U.S. patent application Ser. No. 15/388,270, filed on the same day as this disclosure; U.S. patent application Ser. No.

15/388,239, filed on the same day as this disclosure; U.S. patent application Ser. No. 15/388,213, filed on the same day as this disclosure; and U.S. patent application Ser. No. 15/388,395, filed on the same day as this disclosure.

In one embodiment, a shaft 12 In one embodiment, a shaft 12 acts as an input member to input torque into the wedge clutch 10 from an engine of the vehicle. To activate all-wheel drive or four-wheel drive, the wedge clutch 10 is controlled to close in order to transfer torque from the shaft 12 to an output member 14 (which may be referred to as an outer race), which is coupled to the all-wheel drive or four-wheel drive system. In one example, the output member 14 is a ring gear with external teeth that engage a corresponding gear of the all-wheel or four-wheel drive system.

Both the shaft 12 and the output member 14 may be supported by a housing for rotation about an axis 16. When no torque is transmitted to the output member 14, the output member 14 may freely rotate (or not rotate at all) about the axis irrespective of the rotation of the shaft 12. Alternatively, when the wedge clutch is closed to transmit torque to the output member 14, the output member 14 is fixed to rotate with the shaft 12, as will be described below. The output member 14 may be driveably connected to a transmission output shaft. Two components are driveably connected if they are connected by a power flow path that constrains their rotational speeds to be proportional.

The wedge clutch 10 includes a hub 20 (which may be referred to as an inner race) that is coupled to the shaft 12 via a spline connection, generally shown at 22. For example, the hub 20 may include an inner surface facing the shaft 12 that includes spline surface features that engage with corresponding spline surface features on an outer surface of the shaft 12. While fixing the hub 20 and the shaft 12 radially with respect to one another, the spline connection also enables relative axial movement of the hub 20 relative to the outer surface of the shaft 12.

The hub 20 includes an outer surface 26 that circumferentially extends about the axis 16 and faces away from the axis 16. Likewise, the output member 14 includes an inner surface 28 that circumferentially extends about the axis 16 and faces the outer surface 26. A wedge plate 30 is disposed between the outer surface 26 and the inner surface 28. The wedge plate 30 may include a group of separable plate segments or disks segments connected together. As will be described below in greater detail, the wedge plate 30 or each individual wedge segment includes an inner surface 32 facing toward from the axis 16 that is slideably disposed on the outer surface 26, and an outer surface 34 facing away from the axis 16 that is configured to move into an out of engagement with a groove 50 in the inner surface 28 of the output member 14. When the outer surface 34 of the wedge plate 30 engages the inner, angled surface of the groove 50 of the output member 14, the clutch may be closed and torque may be transmitted through the wedge clutch 10; when the outer surface 34 of the wedge plate 30 is spaced from or disengaged from the groove 50 of the output member 14, the clutch may be open and the torque may not be transmitted through the wedge clutch 10. It should be noted that in one embodiment, the wedge plate 30 and the groove 50 are shaped such that the outer surface 34 of the wedge plate is only able to contact the angled surfaces of the groove 50 but not other portions of the inner surface 28 of the output member 14.

The wedge clutch 10 also includes a cage assembly 100 that contains, locates, and allows equal radial movement of the individual wedge segments of the wedge plate 30. The cage assembly 100 is described in more detail below.

FIGS. 2A-2B show an individual wedge segment 40 (also referred to as a wedge plate segment or a disk segment) of the wedge plate 30. The wedge plate 30 includes a plurality of wedge segments 40. In the embodiment illustrated in this disclosure, five wedge segments 40 are illustrated, but more or less than five may be included in the wedge plate 30. Each wedge segment 40 includes a shoulder 42 sized to receive an annular spring 44 (also referred to as a retaining ring), which is illustrated in FIG. 3A-3B. The spring 44 couples the wedge segments 40 to one another and is biased with a spring force to press the wedge segments 40 inward against the outer surface 26 of the hub 20 toward from the axis 16. The spring 44 has a waved shape, rather than a split body, in order to apply consistent inward radial force amongst the plurality of wedge segments 40.

The inner surface 32 of each wedge segment 40 is tapered. The outer surface 26 of the hub 20 is also tapered to match the profile of the tapered inner surface 32 of the wedge segments 40. This facilitates sliding of the inner surface 32 of the wedge plate 30 along the outer surface 26 of the hub. As will be described in further detail below, sliding of the hub 20 in one direction (e.g., to the left as viewed in FIG. 1) along the wedge plate 30 expands the wedge segments 40 outward to engage with the groove 50 in the inner surface 28 of the output member 14 to lock the clutch; sliding of the hub in the other direction (e.g., to the right as viewed in FIG. 1) along the wedge plate 30 enables the spring 44 to press the wedge segments 40 inward and away from the inner surface 28 of the output member 14 to unlock the clutch 10.

FIGS. 2A and 2B also illustrate an aperture 110 that receives a pin 108 of a cage assembly 100, as will be described in further detail below. The aperture 110 is oblong or oval in shape with a pair of focus points, each having a respective planes or axes passing through. One of the axes 112 is located radially inward from the other axis 114.

Figure 4A:
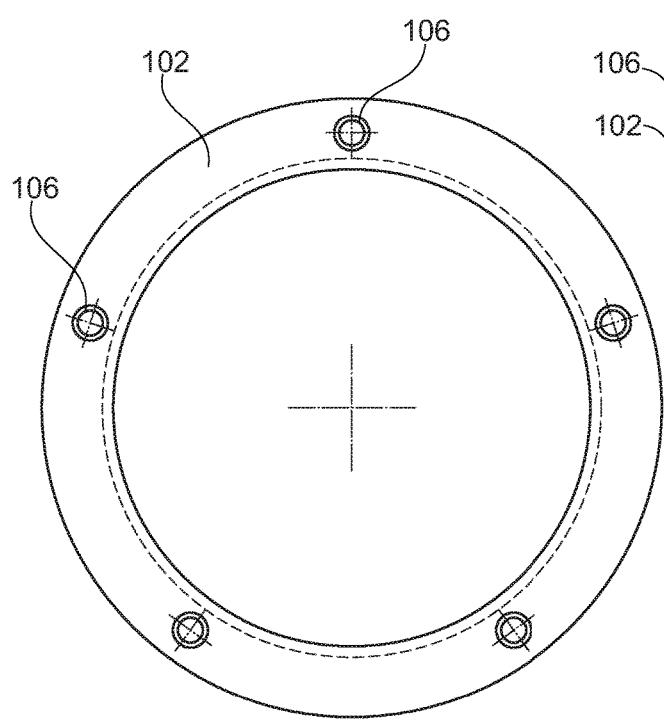
FIG. 4A is a front plan view of washer of a cage assembly, according to one embodiment.
Figure 4B:
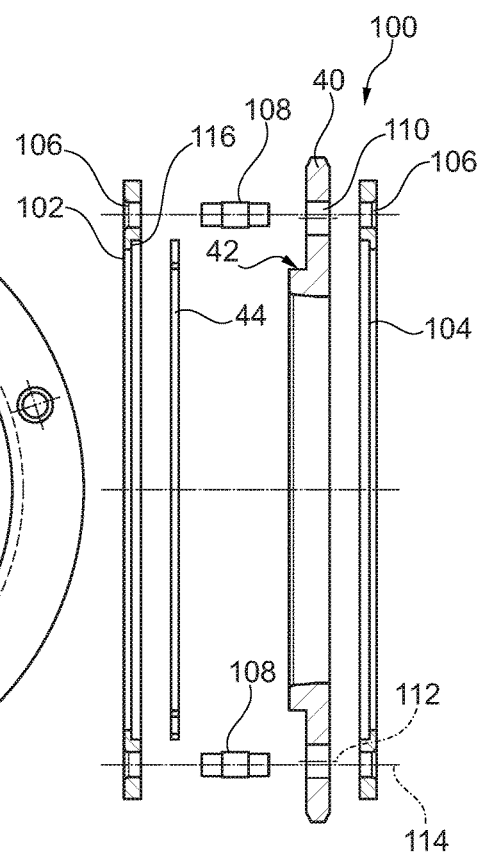
FIG. 4B is a cross-sectional view of a cage assembly having two of the washers of FIG. 4A, along with pins for passing through the wedge segments, according to one embodiment.

As mentioned briefly above, the wedge clutch 10 also includes a cage assembly 100 that contains, locates, and allows equal radial movement of the individual wedge segments of the wedge plate 30. FIGS. 4A and 4B show the cage assembly 100 in isolation and including the spring 44. The cage assembly 100 includes a pair of outer washer flanges 102, 104. The outer washer flanges 102, 104 are washer-shaped (e.g., annular or ring-shaped). Each outer washer flange 102, 104 includes a plurality of apertures 106 arranged annularly about the central axis. The outer washer flanges 102, 104 are connected to each other in a spaced-apart relationship by a plurality of pins 108, with each pin 108 extending into a pair of aligned apertures 106 of the washer flange 102, 104. The washer flanges 102, 104 may be fastened together by the pins 108, which may be riveted, staked, welded, or fastened by other means. Each pin 108 also extends through an aperture 110 provided in each wedge segment 40. Two apertures 106, one pin 108, and the aperture 110 are all aligned along an axis 112.

As will be described below, according to one embodiment the aperture 110 has an inner diameter that exceeds the outer diameter of the pin 108 to allow the wedge segments to move relative to the pin 108 between two different positions when the clutch is locked and unlocked. For example, when the clutch is unlocked, the axis 112 is aligned with a portion of the pin 108. When the clutch is locked and the wedge plates move radially outward, the location of the apertures moves radially as well such that the secondary axis 114 is aligned with the same portion of the pin 108. The inner sidewalls or boundary of the apertures 110 may contact the pins 108 during locking and unlocking, thus limiting or controlling radial movement of the wedge segments.

The outer washer flanges 102, 104 may also be provided with a shoulder 116. The shoulder 116 has a surface facing inward to the spring 44 to constrain the spring 44 within the cage assembly 100. When the cage assembly 100 is assembled, the spring 44 is fit axially between the wedge segments 40 and the shoulder 116 of one of the outer washer flanges 102. The spring is also fit radially between the shoulder 116 of the outer washer flange 102 and the shoulder 42 of the wedge segment 40.

Figure 5:
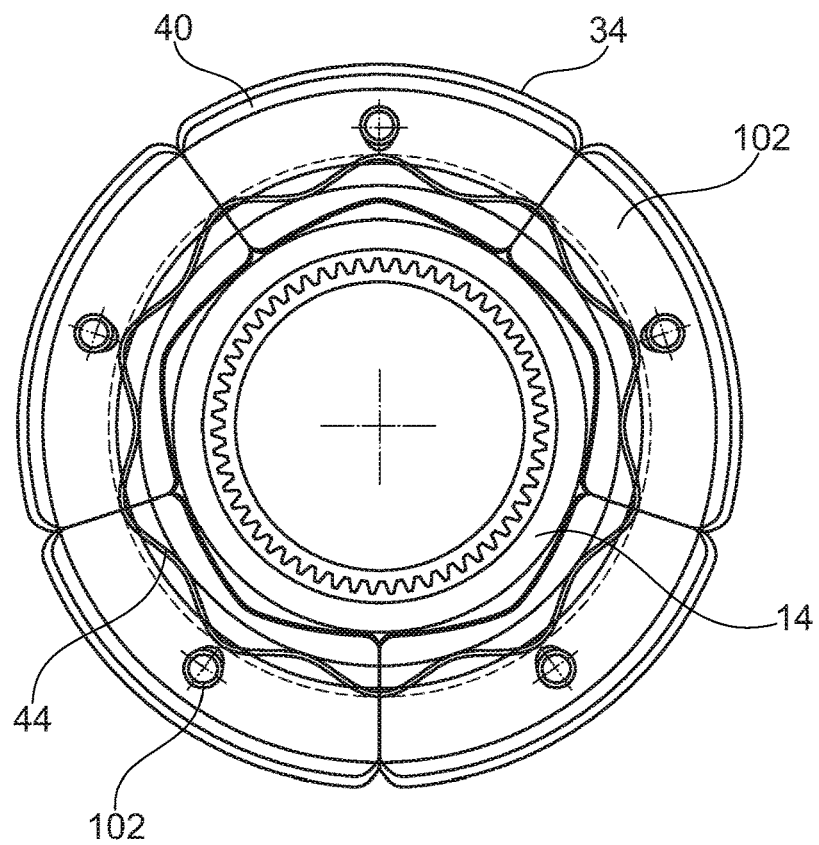
FIG. 5 is a front view of the wedge clutch in an unlocked position, according to one embodiment.
Figure 6:
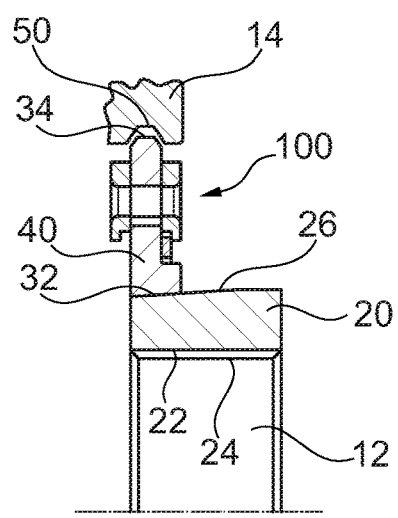
FIG. 6 is a side view of the wedge clutch in the unlocked position, according to one embodiment.
Figure 7:
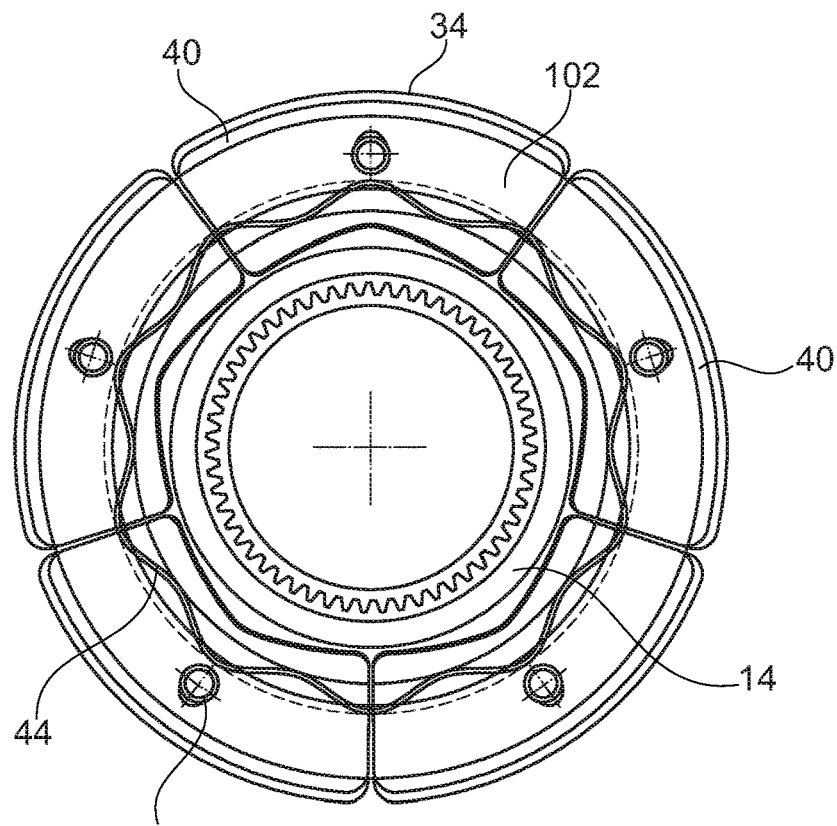
FIG. 7 is a front view of the wedge clutch in a locked position, according to one embodiment.
Figure 8:
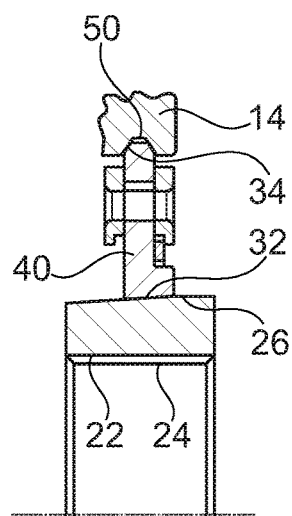
FIG. 8 is a side cross-sectional view of the wedge clutch in the locked position, according to one embodiment

Locking and unlocking of the wedge clutch 10 will now be described with reference to FIGS. 5-8, which include the structure described above and shown in FIGS. 1-4B. FIGS. 5 and 6 show the clutch 10 in its unlocked position in which torque or power does not transmit to the output member 14. FIGS. 7 and 8 show the clutch 10 in its locked position in which torque or power is able to transmit from the shaft 12 to the output member 14.

In the unlocked position illustrated in FIGS. 5 and 6, the hub 20 is disposed along the shaft 12 at a first linear position. The wedge segments 40 are radially contracted inward toward the axis 16 via a biasing force from the spring 44. The biasing of the spring 44 causes the inner surface 32 of the wedge segments 40 to press against the outer surface 26 of the hub 20, and away from the inner surface 28 of the output member 14. The groove 50 on the inner surface 28 may be tapered or otherwise shaped to match the shape of the outer surface 34 of the wedge segments 40. In the unlocked position, the outer surface 34 of the wedge segments 40 is spaced from the groove 50, thereby preventing torque from transmitting from the hub 20 to the output member 14 via the wedge plate 30.

While in the locked position, the cage assembly 100 and spring 44 maintain consistent and even alignment between the wedge segments 40. The pin 108 may be disposed toward the outer side of the aperture 110 of the wedge segment 40 (e.g., along axis 114).

In the locked position illustrated in FIGS. 7 and 8, the hub 20 is translated to be disposed along the shaft 12 at a second linear position (e.g., toward the left). Movement can be accomplished by an actuator (e.g., electromechanical) that provides an actuation force to the hub 20 to move the hub 20 along the spline connection. This movement of the hub 20 causes the tapered inner surface 32 of the wedge segments 40 to slide along the tapered outer surface 26 of the hub 20, thereby expanding the wedge segments 40 outward away from the axis 16. This can slightly separate the wedge segments 40 from one another, as shown in FIG. 7.

When the hub 20 has moved a sufficient distance along the shaft 12, the outer surface 34 of the wedge segments 40 is pressed radially outward toward the groove 50 of the output member 14. The tapered surface of the hub 20 removes the lash from the wedge clutch system, and rotation of the shaft 12, and therefore hub 20, provides the wedge action to allow torque or power to be transferred from the wedge segments 40 to the output member 14 at the interface of the outer surface 34 and the groove 50. The transfer of torque to the output member 14 causes the output member 14 to increase in speed to match that of the hub 20. Once the speeds of the output member 14 and the hub 20 are matched, the clutch is considered to be locked.

When in the locked position, the pin 108 can be disposed toward the inner side of the aperture 110 of the wedge segment 40 (e.g., along axis 112).

The inner surface 32 of each wedge segment 40 may also be provided with a cam surface 58 with an apex. This cam surface 58 engages with a corresponding cam receptacle formed in the outer surface 26 of the hub 20. When in the locked position, each cam surface 58 is wedged within a respective cam receptacle. This inhibits rotation of the wedge plates with respect to the hub when the wedge plate is locked. The outer surface 26 of the hub removes lash from the wedge clutch system and the cam surface 58 creates a wedge effect to lock or couple the powertrain components to transfer power.

The cage assembly 100 provides relatively alignment and spacing between the wedge segments 40 while transitioning between locked and unlocked states. The wedge segments are able to move radially, and are limited in movement due to the apertures of the wedge segments contacting the pins 108. With the tapered hub surface 26, the continuous radial wave spring 44, and the equal wedge segments 40 movement controlled radially by the pins 108, optimum equal locking force is applied to engage the shaft 12 with the output member 14.

The wedge clutch described in the various embodiments above is designed to combat centrifugal force. More specifically, implementing a spring to bias the wedge segments away from the groove in the output member can inhibit unintentional lock-up which could otherwise be caused by centrifugal force of the spinning components forcing the wedge plate outward into engagement with the groove.

The cage assembly captures and controls the relative movement amongst the wedge segments to assure a consistent application of force during locking of the clutch. When the hub is actuated, the tapered surface of the hub contacts the tapered surfaces of the wedge segments, taking out the lash. The cage assembly can rotates a few degrees, and the cams expand wedge segments outward toward the grooves in the rotatable member. All of these actions can take place almost simultaneously to quickly lock the clutch.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A clutch comprising:
    a hub;
    a plurality of wedge segments arranged annularly about an axis and configured to collectively constrict and expand with respect to the axis, each wedge segment including a tapered surface tapered relative to the axis, wherein the tapered surfaces slide along a corresponding tapered surface of the hub as the wedge segments collectively constrict and expand, each wedge segment including an aperture; and a cage assembly configured to control relative movement of the plurality of wedge segments with respect to each other, the cage assembly including a plurality of pins, and each of the pins extending through one of the apertures;

wherein the cage assembly includes first and second washers arranged about the axis, and an annular spring about the axis and configured to bias the wedge segments radially.

2. The clutch of claim 1, wherein the first and second washers each include a plurality of apertures, and each of the pins extending through one of the apertures of each washer.

3. The clutch of claim 2, wherein the apertures of each wedge segment have an oblong profile and the pins have a cylindrical portion extending through the oblong profile such that relative movement of the apertures about the pins is enabled.

4. The clutch of claim 1, wherein the spring is disposed axially between the plurality of wedge segments and one of the washers.

5. The clutch of claim 1, wherein the spring is disposed axially between the first and second washers.

6. A wedge clutch comprising:
an annular disk including a plurality of individual wedge segments arranged about an axis, each wedge segment including a tapered surface tapered relative to the axis, wherein the tapered surfaces slide along a corresponding tapered surface of a hub as the wedge segments collectively radially constrict and expand, wherein radial movement of the wedge segments toward and away from the axis locks and unlocks the clutch;

a cage assembly coupled to each of the wedge segments and configured to control radial movement of the wedge segments during locking and unlocking of the clutch, wherein the cage assembly includes a plurality of pins, each of the pins extending through one of the wedge segments;

first and second washers arranged axially on either side of the annular disk; and an annular spring extending about the axis and disposed radially between the washers.

7. The wedge clutch of claim 6, wherein each wedge segment includes an aperture therethrough that receives a respective one of the pins, and the apertures each having a perimeter that exceeds a perimeter of the pins to allow relative movement of the apertures about the pins.

8. The wedge clutch of claim 6, wherein each wedge segment includes an aperture therethrough to receive a respective one of the pins, the apertures each have an oblong profile, and the pins each have a cylindrical profile.

9. The wedge clutch of claim 6, wherein each pin extends into the first and second washers.

10. A cage assembly for controlling radial movement of wedge segments of a wedge clutch, the cage assembly comprising:
a pair of spaced-apart annular washers on either side of the wedge segments;
a plurality of pins connecting the washers and extending through the wedge segments; and
an annular spring disposed between the washers for biasing radial movement of the wedge segments.

11. The cage assembly of claim 10, wherein the pins are fixed to the washers and the wedge segments are moveable while radially guided by the pins.

12. The cage assembly of claim 10, wherein each of the pins extends through a respective one of the wedge segments such that each of the wedge segments are coupled to one another via the cage assembly.

13. The cage assembly of claim 10, wherein each of the pins includes a central portion that has a cylindrical profile for extending through a respective oblong aperture in one of the wedge segments to allow relative movement of the wedge segments while guided by the pins.

14. The cage assembly of claim 10, wherein the spring has a wavy profile to facilitate distribution of a biasing force provided to the wedge segments.

* * * * *